United States Patent
Lim et al.

(10) Patent No.: US 7,827,875 B2
(45) Date of Patent: Nov. 9, 2010

(54) GYRO PRECESSIONAL AUTOMATIC TRANSMISSION

(75) Inventors: Sung Chol Lim, Pyongyang (KP); Gi Hun Han, Pyongyang (KP); Gi Hyok Han, Pyongyang (KP)

(73) Assignee: Guardian Enterprises Ltd., Hong Kong (CN)

( * ) Notice: Subject to any disclaimer, the term of this patent is extended or adjusted under 35 U.S.C. 154(b) by 585 days.

(21) Appl. No.: 11/718,683

(22) PCT Filed: Nov. 7, 2005

(86) PCT No.: PCT/KP2005/000004

§ 371 (c)(1),
(2), (4) Date: May 4, 2007

(87) PCT Pub. No.: WO2006/052036

PCT Pub. Date: May 18, 2006

(65) Prior Publication Data

US 2008/0103007 A1    May 1, 2008

(30) Foreign Application Priority Data

Nov. 10, 2004 (KP) .............................. KP-04-155

(51) Int. Cl.
*F16H 33/10* (2006.01)

(52) U.S. Cl. ........................................ 74/5.22; 475/254
(58) Field of Classification Search ................. 475/254, 475/257, 268; 74/5.22
See application file for complete search history.

(56) References Cited

U.S. PATENT DOCUMENTS 3,495,479 A * 2/1970 Rass ........................... 475/268

* cited by examiner

*Primary Examiner*—Sherry L Estremsky
*Assistant Examiner*—Edwin A. Young
(74) *Attorney, Agent, or Firm*—Baker & Daniels LLP (57) ABSTRACT

An automatic transmission consisting of a planetary gear unit comprising in combination an input shaft (1), an input gear (2), a key planet gear (3), an output gear (4), an output shaft (5), a bearing planet gear (6), a rotating frame (7), a rotor (8), wherein the planet shaft is the rotor (8) having a certain inertia moment, so its revolving is equivalent to the precession of a gyroscope due to an external force wherein the precession-production external force is the load acting on the output shaft (5). Hence the revolutionary speed of the rotor (8) varies depending upon changes in the output load and the same holds true for the rotational speed of the output shaft (5), which makes the speed ratio spontaneously vary with changes in the outpot load. Accordingly, the transmission of the present invention operates at speed ratios spontaneously varying with changes in load, without any controlling operation.

9 Claims, 8 Drawing Sheets

GYRO PRECESSIONAL AUTOMATIC TRANSMISSION

TECHNICAL FIELD

The present invention relates to an automatic transmission requiring speed to vary with changes in load and more particularly to an automatic transmission consisting of a planetary gear unit with a gyroscope.

BACKGROUND OF THE INVENTION

Automatic transmissions are well known, in particular, in motor vehicle manufacturing.

Hydraulic automatic transmissions constitute a major kind of automatic transmissions of motor vehicles for its smooth running, facility to operate and good power characteristics as well as for its guaranteed security. However, using hydraulic drives lowers their transmission efficiencies and adds to the cost.

Electromechanical automatic transmissions merely employ gear drives, so they have a high efficiency and require a comparatively low cost. However they have problems associated with a combination of gear change and power transmission and there are some errors in their flexible elements. Accordingly, they can not be considered suitable to get a good running.

Stepless automatic transmissions or continuously variable transmissions were regarded as good from the outset and now are in maturity. They overcome such problems with the aid of electronic controlling systems as torque capacity, noise and reliability. However cost problem still remains unsolved.

In dual-path hybrid automatic transmissions consisting of two paths i.e. a planetary drive path and a generator-electromotor drive path, such as the examples disclosed in U.S. Pat. No. 6,416,437 B2, US2003/0176955 A1 and International Publication No. WO242658, and the Toyota hybrid system (THS), the planetary drive has a high efficiency because a direct transfer of power is made by means of gears therein but the generator-electromotor drive is low in efficiency due to transferring power through several energy conversions, and yet the said transmissions become more complex in construction for their complicated driving process, which results in a high overall cost.

In six or seven stage automatic transmissions, speed ratio ranges are narrow in each stage and wide between the highest and lowest stages, and thus a prompter speed change is achievable with the aid of electronic controls. Therefore, fuel consumption is low and respondability is high, which improves the movability and accelerability of motor vehicles. However, the same transmissions become more complex in construction and require a sophisticated control system, which adds to the cost. In addition, using hydraulic converters causes not a small loss in power transfer and a constant control operation forms many inflection points on the characteristic curves of the transmissions. Hence, these transmissions can not be considered to be mechanically perfect ones.

Therefore, problems associated with prior art automatic transmissions include transmitting process, reliability, cost, control, respondability and efficiency etc.

SUMMARY OF THE INVENTION

It is an object of the present invention to provide the public with a gear type automatic transmission fully meeting the mechanically necessary and sufficient conditions for its own use, which operates at speed ratios spontaneously varying with changes in load without changing gear (with changing neither gear nor gear mesh combination) wherein the speed ratio is kept equal to the proportion of the output torque to the input torque.

An aspect of the disclosed invention is an automatic transmission consisting of a planetary gear unit which is a bevel gear assembly preferably having one planet shaft wherein the planet shaft is a rotor with a given inertia moment and wherein the rotational axis of the planet shaft is perpendicular to the revolutionary axis thereof. In the alternative, the planetary gear unit has a plurality of planet shafts which are rotors with a given inertia moment.

As the planet shaft is a rotor with a given inertia moment, it functions as a gyroscope and its revolution is equivalent to the precession of a gyroscope wherein the external force producing the precession is the load applied to the output shaft. Therefore the revolutionary speed of the planet shaft varies with changes in the output load and the same holds true for the rotational speed of the output shaft. This enables the transmission to run at speed ratios spontaneously varying with changes in the output load, without any controlling operation for changing speed.

Another preferred embodiment of the invention is an automatic transmission consisting of a planetary gear unit, which preferably is a bevel gear assembly, comprising preferably three planet shafts inwardly mounted on a rotating frame which is positioned between the input and output gears such that the planet shafts are perpendicular to the axis extended between the input and output shafts, and further comprising preferably three rotors with a given inertia moment which are outwardly arranged between the planet shafts on the rotating frame. In the alternative, the planetary gear unit is an annular-cylindrical gear assembly or two cylindrical gear assemblies.

Each of the rotors has a rotor gear adapted to cause it to rotate relative to the rotating frame through an auxiliary gear mounted on the input shaft. If the input shaft rotates at a certain speed, then the rotors rotate with the aid of the auxiliary gear and thus the rotating frame is kept from rotating by a gyroscopic moment. Hence power is delivered to the output gear through the input gear and the planet gears. If a load, to which the output gear may be subjected, acts on the rotating frame through the planet shafts, then the rotating frame rotates, thereby the rotors going into precession. Accordingly, the rotational speed of the rotating frame varies depending upon changes in the output load, and the transmission operates at speed ratios spontaneously varying with the output load changes.

DETAILED DESCRIPTION OF THE PREFERRED EMBODIMENT

Figure 1:
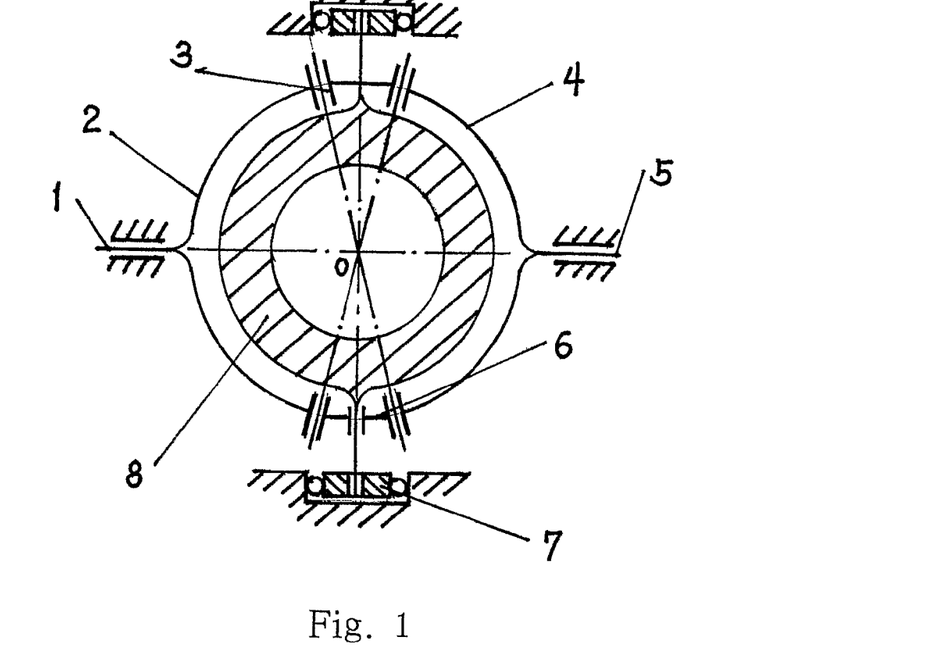
FIG. 1 is a schematic view of an automatic transmission of the present invention showing the operation and structure, wherein the planetary gear unit is a bevel gear assembly having one planet shat which is a rotor.

One embodiment of the present invention is illustrated in FIG. 1.

Figure 3:
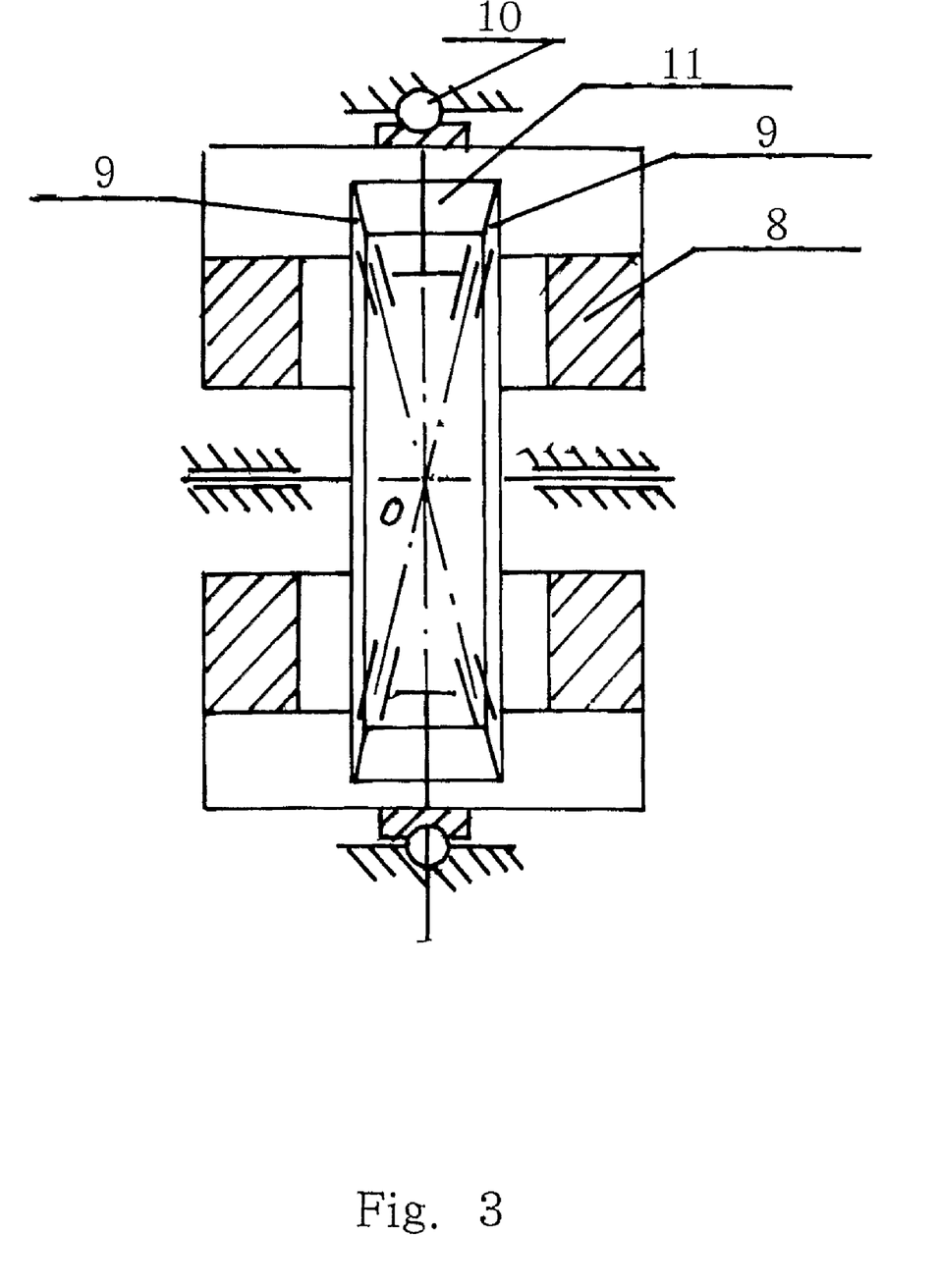
FIG. 3 is a schematic view of an automatic transmission of the present invention showing the operation and structure, wherein the planetary gear unit is a bevel gear assembly having a plurality of planet shafts which are rotors, slidably supported.
Figure 4:
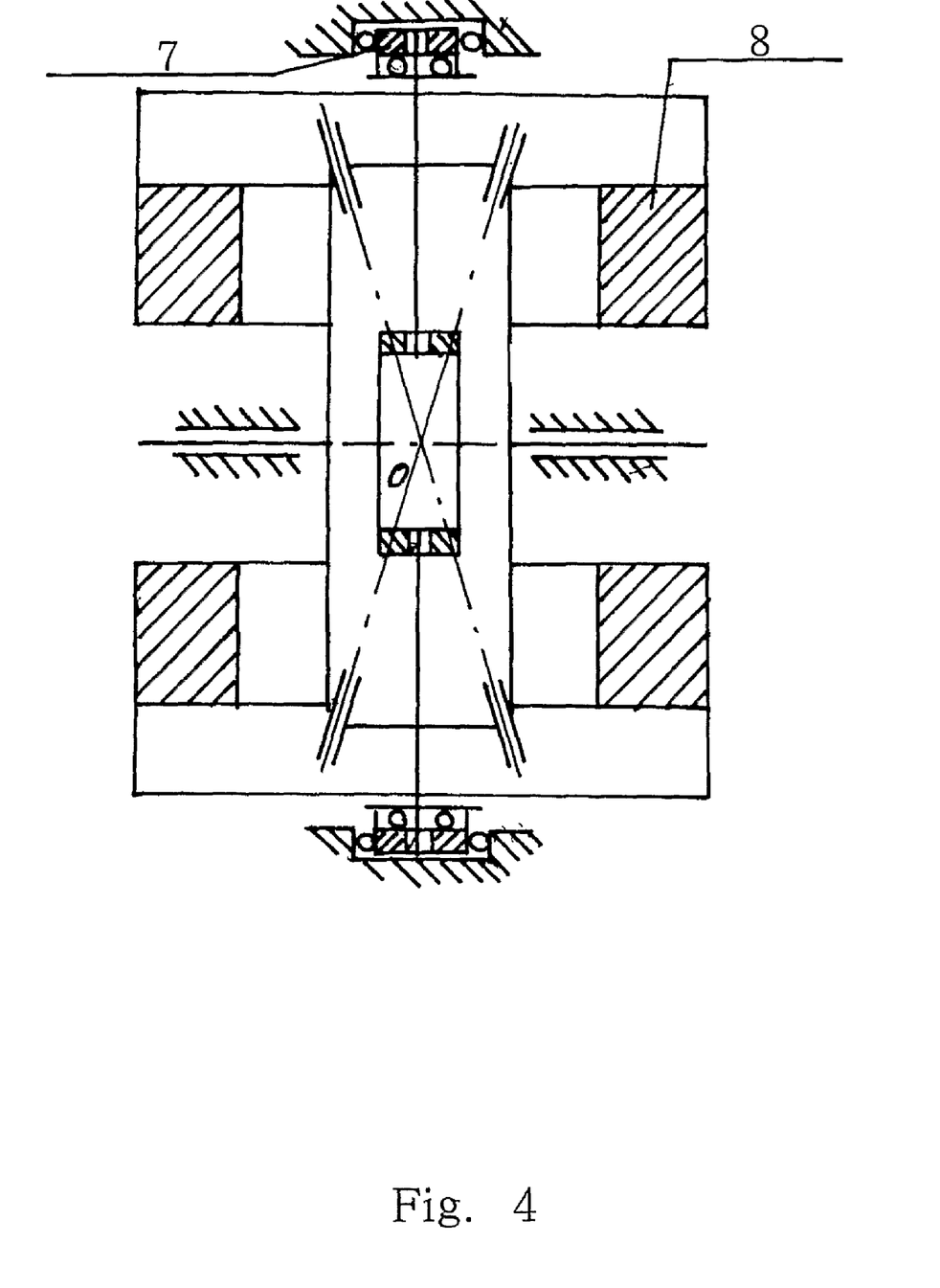
FIG. 4 is a schematic view of an automatic transmission of the present invention showing the operation and structure, wherein the planetary gear unit is a bevel gear assembly having a plurality of planet shafts which are rotors, rollably supported.

The transmission consists of a planetary gear unit preferably having four bevel gears and one planet shaft which is a rotor with a given inertia moment. In the alternative, the planetary gear unit has a plurality of planet shafts which are rotors with a given inertia moment (FIGS. 3 and 4).

Referring to FIG. 1, an input gear 2 mounted on an input shaft 1 is positioned, along an identical axis, opposite to an output gear 4 mounted on an output shaft 5, between which a rotor 8 functioning as a planet shaft is positioned perpendicularly to the same axis. The rotor 8 has a key planet gear 3 and a bearing planet gear 6 and is at both ends supported in a rotating frame 7 preferably by means of bearings, like a gyroscope mounted on a universal-joint shaft. The key planet gear 3 is immovably fitted onto the rotor 8 by means of a key to perform two functions of transmitting power from the input gear 2 to the output gear 4 and of causing the rotor 8 to rotate and the bearing planet gear 6 is movably fitted onto the rotor 8 by means of bearings to merely perform a function of transmitting power from the input gear 2 to output gear 4.

In precession, the precession center of the rotor 8 lies at the center along its rotational axis (at point 0 in FIG. 1) such that a pair of the rotational axial forces (precession-produced centrifugal forces) are in balance to each other. If the input shaft 1 rotates at a certain speed with no load on the output shaft 5, then the rotor 8 rotates without revolving around the center along its axis. While keeping the input shaft 1 rotating, if a load is applied to the output shaft 5, the rotor 8 revolves, and a gradual increase in the load increases the revolving speed correspondingly. This means that the rotor 8 rotating at a certain speed goes into precession by exertion of an external force. So to speak, revolution of the rotor 8 is a precession of itself as a gyroscope, which is created by an external force, namely, the output load exerted on the rotor 8 rotating at a certain speed.

Figure 2:
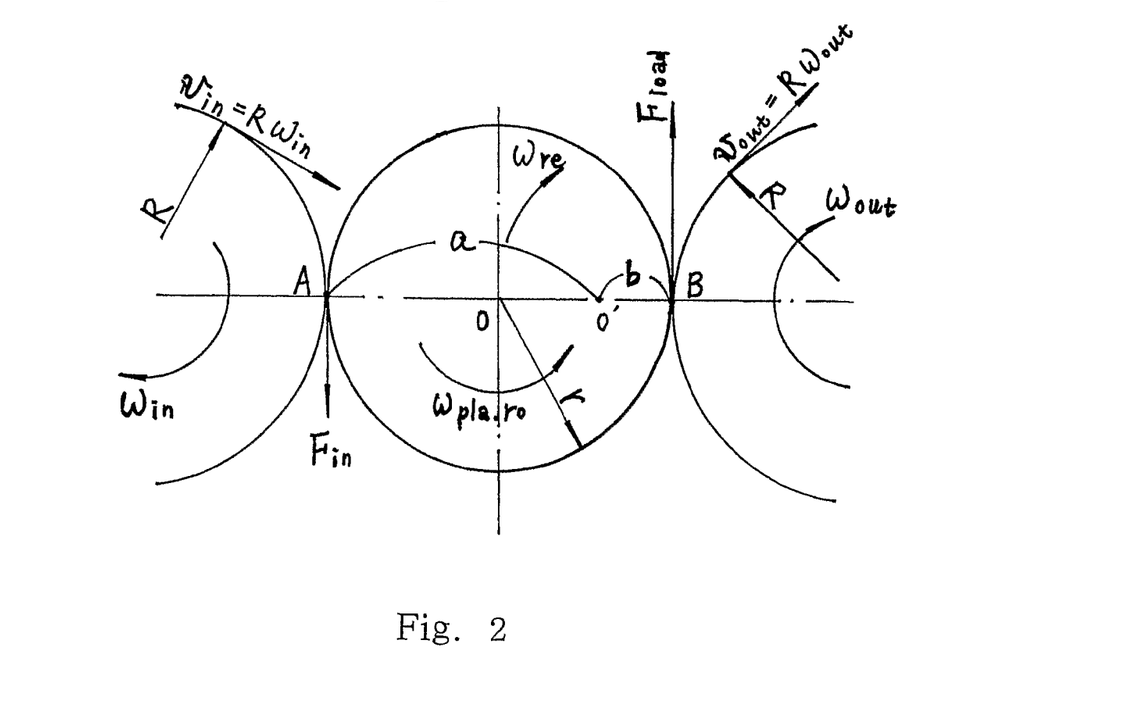
FIG. 2 is a schematic view showing the balance, at a planet gear, between the moment with respect to the instantaneous rotation center by the input torque and that by the output torque.

The precessional speed (revolutionary angular speed) may be expressed by the formula:

$$\omega_{re} = \omega_{pre} = \frac{F_{out} \cdot R}{J \cdot \omega_{ro}} = \frac{M_{out}}{J \cdot \omega_{ro}} \quad (1)$$

where
$\omega_{re}$—Revolutionary angular speed of the rotor
$\omega_{pre}$—Precession angular speed of the rotor
$\omega_{ro}$—Proper angular speed of the rotor (rotational angular speed)
J—Inertia moment of the rotor
$F_{out}$—Force the rotor is subjected to due to output load
R—Vertical distance from the action point of the load torque to the precession center
$M_{out}$—Load torque acting on the output shaft It follows from the formula (1) that in the transmission, revolution of the rotor 8 is a precession of itself that depends on the output load. FIG. 2 is a schematic drawing where an input gear, an output gear and a planet gear are shown unfolded on a single plane for convenience. At point 0' in FIG. 2, $$\omega_{re} \cdot b = \omega_{pla,ro} \cdot (r-b)$$

where o' is the instantaneous rotation center of the planet gear.
Rearranging the above relation $$\frac{\omega_{re}}{\omega_{pla,ro}} = \frac{r}{b} - 1 \quad (2)$$

Referring to formula (2), the instantaneous rotational center of the planet gear varies in position according to changes in the revolutionary speed of the planet shaft. In the transmission, as shown in FIG. 2, the moment with respect to the instantaneous rotational center of the planet gear by the input torque and that by the output torque are always balanced.

$$F_{in} \cdot a = F_{out} \cdot b \quad ③$$

Multiplying the both sides of the above formula by $\omega_{pla,ab}$ (absolute angular speed of the planet gear)

$$F_{in} \cdot a \cdot \omega_{pla,ab} = F_{out} \cdot b \cdot \omega_{pla,ab}$$

Since there is no slide relative to each other at the meshing points A and B of the gears, $$a \cdot \omega_{pla,ab} = v_{in}, b \cdot \omega_{pla,ab} = v_{out}$$

Hence, the following formula is obtained $$F_{in} \cdot v_{in} = F_{out} \cdot v_{out}$$

where $$v_{in} = R \cdot \omega_{in}, v_{out} = R \cdot \omega_{out}$$

Therefore, the formula (3) becomes:

$$M_{in} \cdot \omega_{in} = M_{out} \cdot \omega_{out} \quad ④$$

The following formula is obtained from the formula ④:

$$\frac{\omega_{in}}{\omega_{out}} = \frac{M_{out}}{M_{in}}$$

Accordingly the speed ratio $$i = \frac{\omega_{in}}{\omega_{out}} = \frac{M_{out}}{M_{in}}$$

As described above, the transmission has such features that in operation, speed ratio varies continuously with changes in the output load and is always equal to the proportion of the output torque to the input torque. The precessional axis of the rotor 8 is perpendicular to its proper rotational axis, so precession of the rotor 8 produces a pair of centrifugal forces with its origin at the precession center.

As shown in FIG. 1, the precession center of the rotor 8 is located at the center along its rotational axis, and as a result, precession of the rotor 8 creates a pair of centrifugal forces, equal in magnitude, opposite in direction on a single straight line and thus balanced with each other, and further creates a gyroscopic moment causing its proper rotational axis to incline toward its precessional axis. Hence the rotor 8 needs supporting against the gyroscopic moment for its precession and thus is supported by the rotating frame 7, as shown in FIG. 1. In the alternative, the rotors are sidably supported preferably by bearings (see FIG. 4) and rollably supported preferably by guide rollers 9, support globes 10 and support rollers 11 (see FIG. 3) against a precession-created centrifugal force and a gyroscopic moment.

The rotor 8 is, in precession, subjected to a gyro moment causing its proper rotational axis to incline toward its precessional axis and a pair of centrifugal forces being set up along the proper rotational axis, all of which are in perpendicular direction to the precessional axis. Therefore, during precession no work is done and no loss in energy is caused, and the process of precession is no more than that of the potential variation of a force field for transmitting power. In that sense, power transmitting herein is the same as in a traditional gear drive from an efficiency point of view. In addition, a precession is a non-inertial motion and thus has an accurate synchronization with changes in load, which improves the respondability of a transmission and provides a best movability and accelerability to a motor vehicle.

Figure 5:
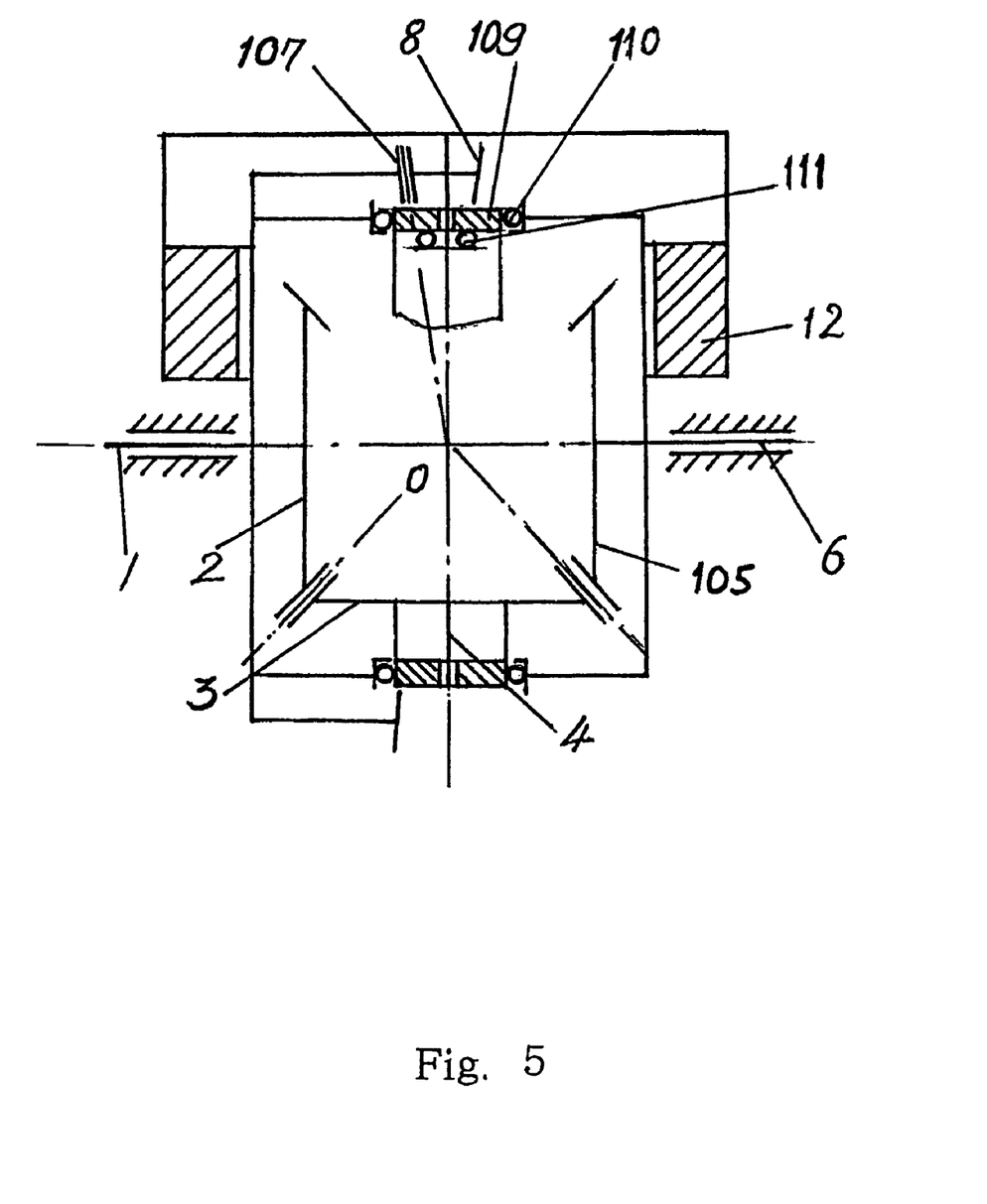
FIG. 5 is a schematic view of an automatic transmission of the present invention showing the operation and structure, wherein the planetary gear unit is a bevel gear assembly having a plurality of planet shafts and a plurality of rotors respectively fixed to a rotating frame.

FIG. 5 shows another preferred embodiment of the present invention.

Figure 6:
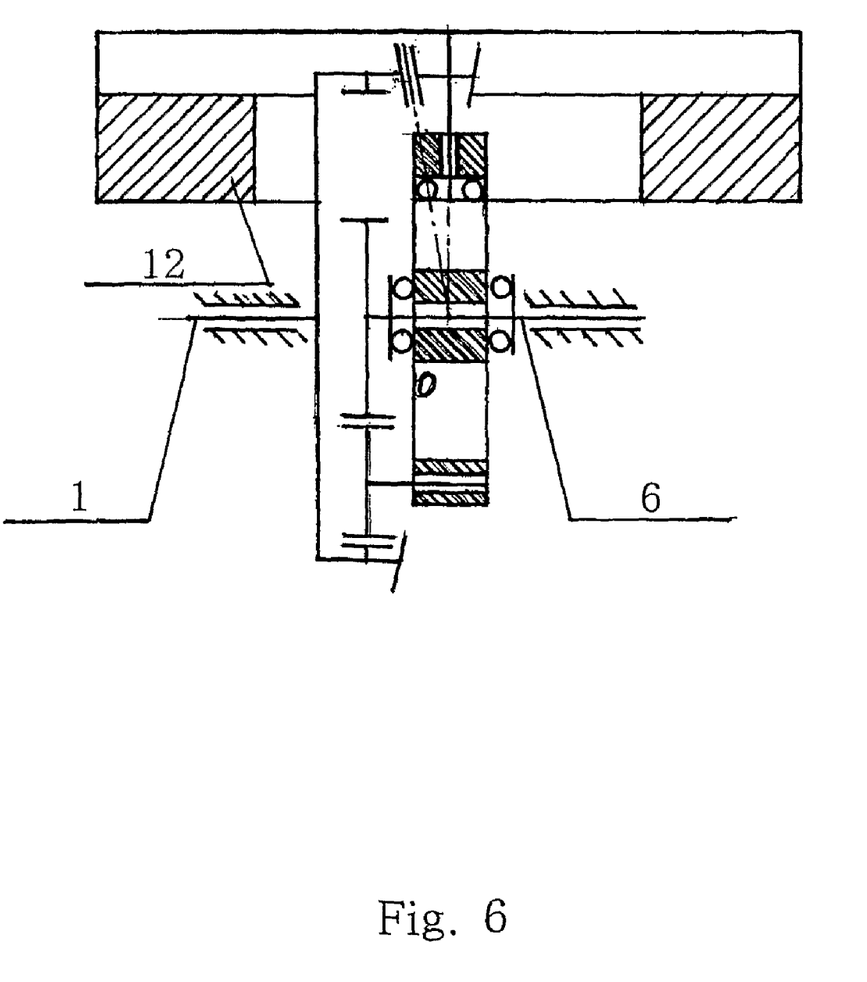
FIG. 6 is a schematic view of an automatic transmission of the present invention showing the operation and structure, wherein the planetary gear unit is an annular-cylindrical gear assembly having a plurality of planet shafts and a plurality of rotors respectively fixed to a rotating frame.
Figure 7:
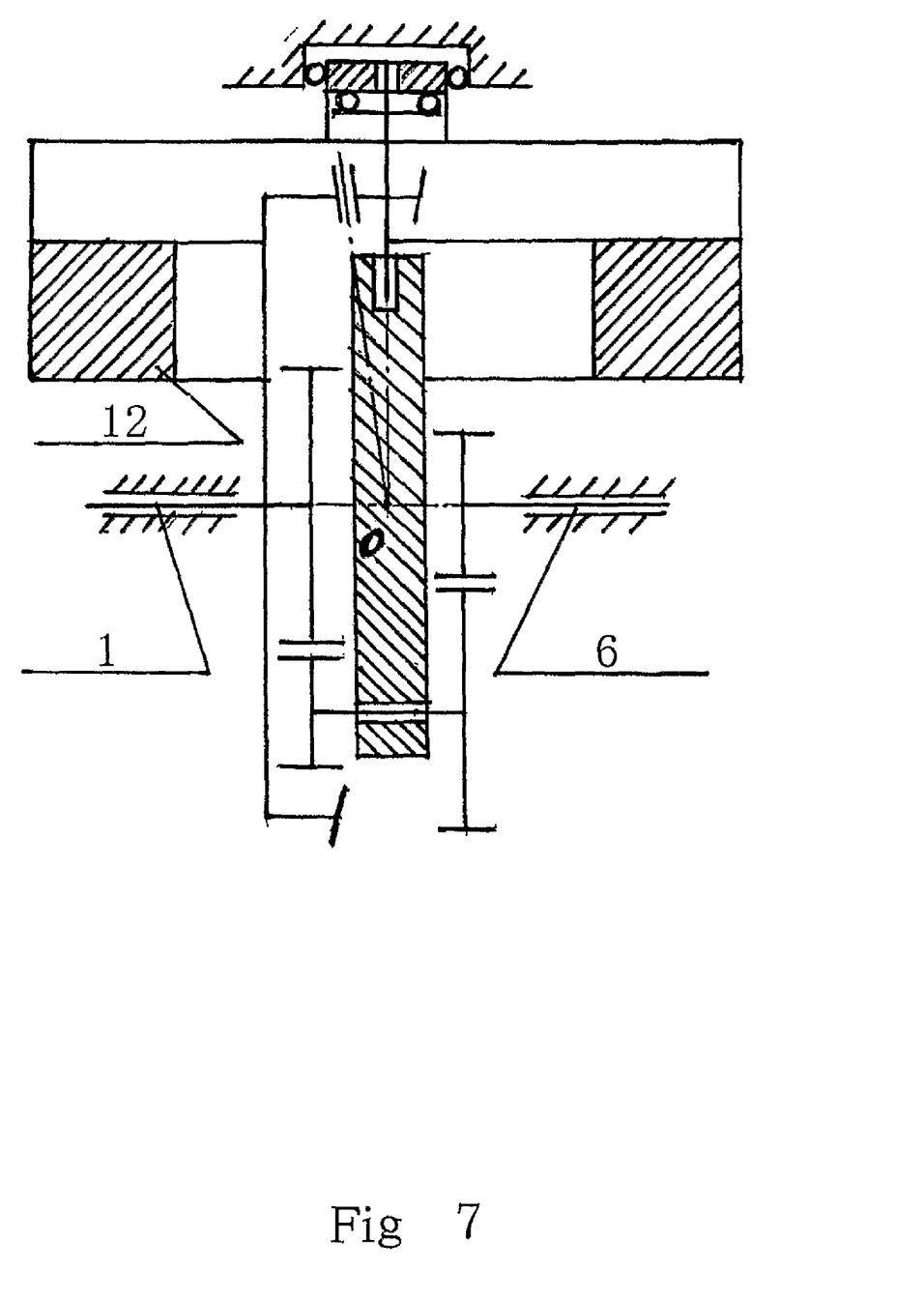
FIG. 7 is a schematic view of an automatic transmission of the present invention showing the operation and structure, wherein the planetary gear unit is two cylindrical gear assemblies having a plurality of planet shafts and a plurality of rotors respectively fixed to a rotating frame.

The transmission consists of a planetary gear unit comprising an input gear 2, an output gear 105, preferably three planet gears 3, all of which preferably are bevel gears, and further comprising preferably three rotors 12 with a given inertia moment. In the alternative, the planetary gear unit is an annular-cylindrical gear assembly or two cylindrical gear assemblies (FIG. 6 and FIG. 7).

The input gear 2 faces the output gear 105 coaxially. Three planet shafts are, preferably at equal circumferential intervals, mounted on a rotating frame 109 which is positioned between the input gear 2 and output gear 105 such that the planet shafts are perpendicular to the axis extended between the input shaft 1 and output shaft 106. On the rotating frame 109, preferably three rotors 12 are outwardly arranged between the planet shafts at equal circumferential intervals. Each of the rotors 12 has a rotor gear 8 adapted to rotate it relative to the rotating frame 109 through an auxiliary gear 107 mounted on the input shaft 1. If the input shaft 1 rotates at a given speed, then the rotors 12 rotate with the aid of the auxiliary gear 107 and thus the rotating frame 109 is kept from rotating by a gyroscopic moment. As a result, power is delivered to the output gear 105 through the input gear 2 and the planet gear 3. If a load, to which the output gear 105 may be subjected, is exerted on the rotating frame 109 through the planet shafts, then the rotating frame 109 rotates, thereby the rotors 12 going into precession. Accordingly, the rotational speed of the rotating frame 109 varies depending upon changes in load and this embodiment also operates at speed ratios spontaneously varying with changes in load. In addition, as the precession centers O of the rotors 12 are located as shown in FIG. 5 in precession the rotors 12 are subjected to centrifugal forces, against which they are supported preferably by rotor thrust bearings 111, and to gyro moments against which they are supported preferably by rotating frame thrust bearings 110.

Figure 8:
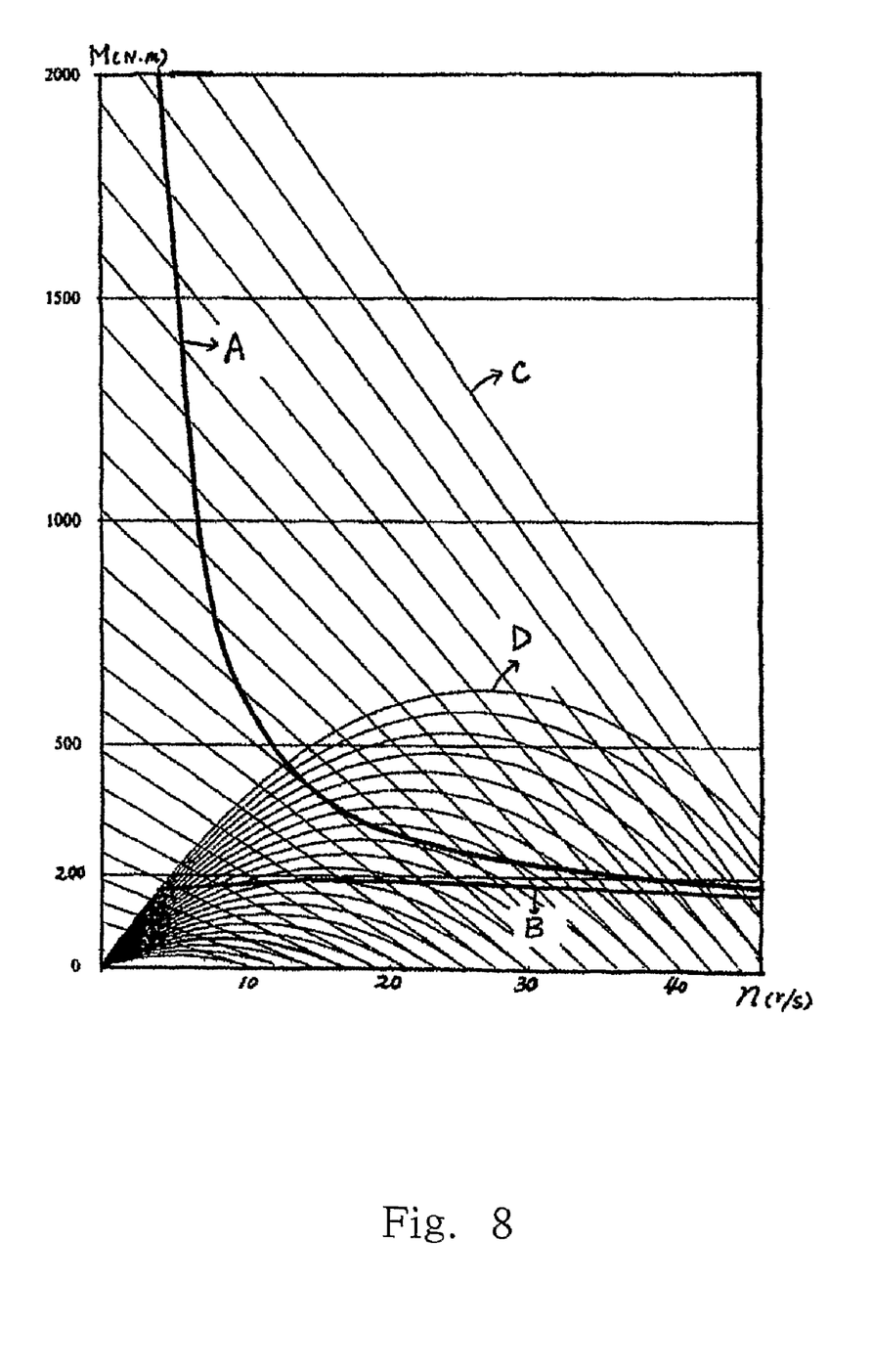
FIG. 8 is a graph showing the characteristics of the present invention.

FIG. 8 shows the characteristics of the transmission of the present invention. The curve A is a graph comparing torque with load. B is a graph of engine torque and C is a graph of the transmission torque at a given speed of the engine, and D is the load torque applied to the engine at a given speed. The coordinate is a torque axis and the abscissa is an axis of rotation number of engine.

Figure 9:
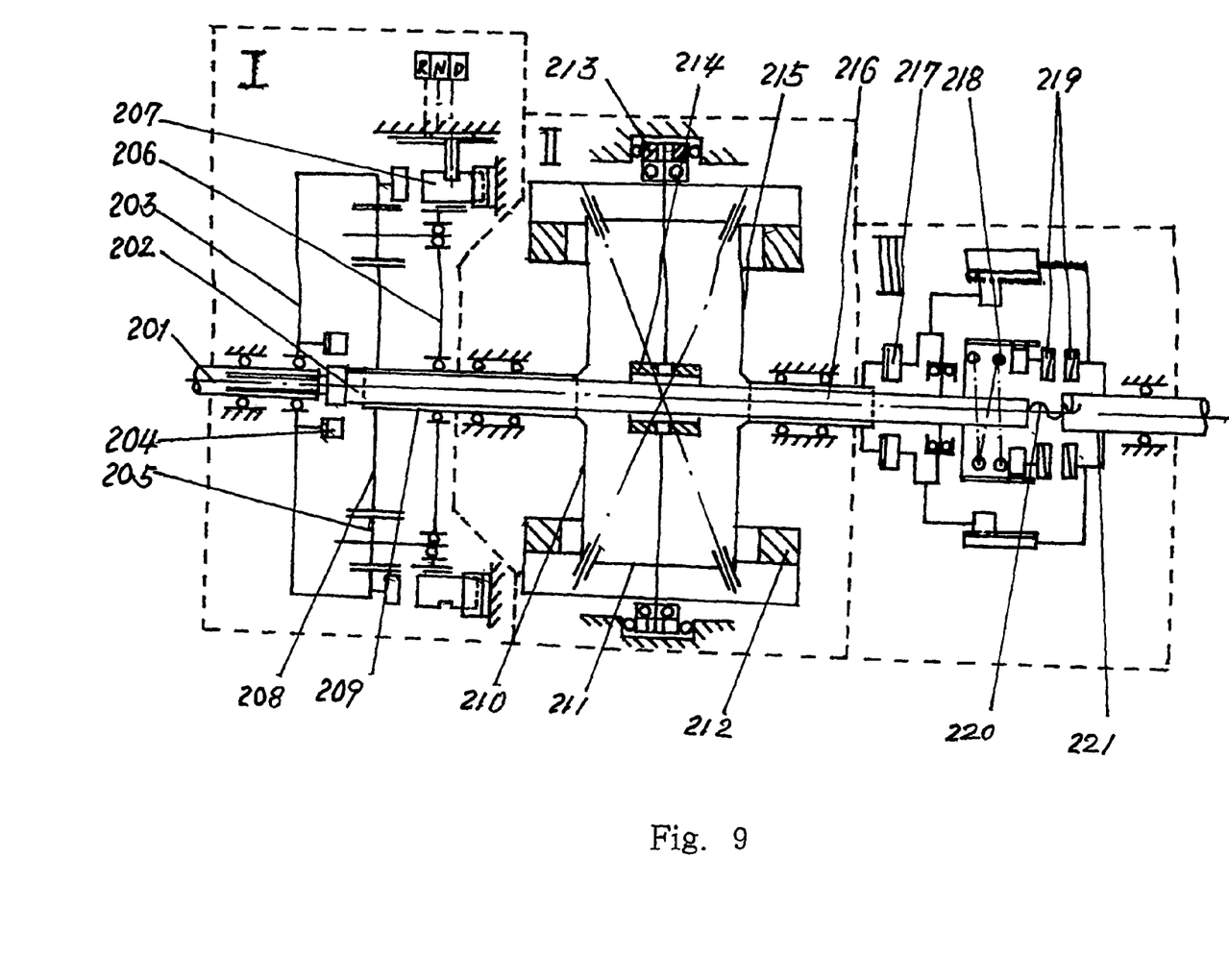
FIG. 9 is a schematic view of an automatic transmission of the present invention for a motor vehicle, showing the structure in an assembled state.

FIG. 9 shows a gyro precessional automatic transmission for a motor vehicle.

Part I is a forward/backward/neutral converting part comprising in combination a power shaft 201, a direct connection spline shaft 202, an annular gear 203, an input ratchet clutch 204, a direction converting planet gear 205, a planet gear rotating frame 206, a direction converter 207, a direction converting sun gear 208 and an input shaft 209.

Part II is a speed changing part comprising in combination an input gear 210, a planet gear 211, a rotor 212, a rotating frame 213, an internal rotating frame 214, an output gear 215 and an output shaft 216.

Part III is a direct connection part comprising in combination an output ratchet clutch 217, a coupling spring 218, a critical torque automatic clutch 219, a screw combiner 220 and a drive shaft 221.

In part I, the power from the power shaft 201 is transmitted to the input shaft 209 through the direct connection spline shaft 202 and the input ratchet clutch 204. The direction converter 207 can make a conversion of direction into forward/backward/neutral. The rotation number in part I gets greater than that in part II.

In part II, power is transmitted to the output gear 215 though the input gear 210, speed varying with changes in load.

In part III, when the rotational speed of the output shaft 216 is lower than that of the engine, power is transmitted to the drive shaft 221 through the output ratchet clutch 217 and when higher, the input ratchet clutch 204 and the output ratchet clutch 217 are disengaged with the aid of the screw combiner 220, power is directly transmitted to the drive shaft 221 through the direct connection spline shaft 202. If the load torque exceeds a prescribed limit, then the critical torque automatic clutch 219 goes into action and thereby the input ratchet clutch 204 and the output ratchet clutch 217 are engaged, so that power is passed through part II.

In a motor vehicle equipped with a gyro-precessional automatic transmission, the driver's intention can be realized only by a gas pedal and a brake pedal.

The invention claimed is:

1. A gyro precessional automatic transmission comprising a planetary gear unit wherein a planet shaft functions as a gyroscope by adding a certain inertia moment thereto, thereby power being transmitted and wherein revolution of the planet shaft becomes a precession of itself due to an output load, thereby speed spontaneously varying with changes in the output load; the planetary gear unit is a bevel gear assembly with a plurality of planet shafts wherein in operation, the precession centers of the planet shafts are focused on a single point along the axis extended between input and output shafts, and further comprising an automatic critical torque clutch whereby, if the output load is below a prescribed limit, the front and rear shafts of the transmission are connected, thus the whole of the transmission becoming a single shaft and a direct connection drive being made and whereby, if the output load exceeds a prescribed limit, the connected shafts are disconnected, thus the rotors going into precession and gear ratio spontaneously varying with changes in the output load.

2. The gyro precessional automatic transmission as claimed in claim 1 wherein the planetary gear unit is a bevel gear assembly with one planet shaft wherein in operation, the precession center of the planet shaft lies at a center along its axis.

3. The gyro precessional automatic transmission as claimed in claim 1 wherein the planet shafts are slidably supported against a centrifugal force and a gyroscopic moment by means of thrust bearings and radial bearings.

4. The gyro precessional automatic transmission as claimed in claim 1 wherein the planet shafts are rollably supported against a centrifugal force and a gyroscopic moment by means of support globes and support rollers.

5. A gyro precessional automatic transmission comprising a planetary gear unit comprising a plurality of planet shafts and a plurality of rotors with a given inertia moment respectively mounted on a rotating frame wherein the rotors are capable of rotating relative to the rotating frame and thus keep the rotating frame from rotating, functioning as gyroscopes when rotating, thereby power being transmitted and wherein if the rotating frame rotates by an output load, the rotors go into precession, and further comprising an automatic critical torque clutch whereby, if the output load is below a prescribed limit, the front and rear shafts of the transmission are connected, thus the whole of the transmission becoming a single shaft and a direct connection drive being made and whereby, if the output load exceeds a prescribed limit, the connected shafts are disconnected, thus the rotors going into precession and gear ratio spontaneously varying with changes in the output load.

6. The gyro precessional automatic transmission as claimed in claim 5 wherein the planetary gear unit is a bevel gear assembly.

7. The gyro-precessional automatic transmission as claimed in claim 5 wherein the planetary gear unit is an annular-cylindrical gear assembly.

8. The gyro precessional automatic transmission as claimed in claim 5 wherein the planetary gear unit comprises two cylindrical gear assemblies.

9. A gyro precessional automatic transmission, comprised of a planetary gear unit wherein a planet shaft functions as a gyroscope by adding a certain inertia moment thereto, thereby power being transmitted and wherein revolution of the planet shaft becomes a precession of itself due to an output load, thereby gear ratio spontaneously varying with changes in the output load, wherein the planetary gear unit is a bevel gear assembly with a plurality of planet shafts and a plurality of rotors with a given inertia moment respectively mounted on a rotating frame wherein the rotors are capable of rotating relative to the rotating frame and thus keep the rotating frame from rotating, functioning as gyroscopes when rotating, and wherein if the rotating frame rotates by the output load, the rotors go into precession, wherein in operation, precession centers of the planet shafts are focused on a single point along the axis extended between input and output shafts, wherein the planet shafts are rollably supported against a centrifugal force and a gyroscopic moment by means of support globes and support rollers, and wherein an automatic torque clutch is incorporated whereby, if the output load is below a prescribed limit, the front and rear shafts of the transmission are connected, thus the whole of the transmission becoming a single shaft and a direct connection drive being made and, if the output load exceeds a prescribed limit, the connected shafts are disconnected, thus rotors go into precession and the gear ratio spontaneously varying with changes in the output load.

* * * * *